3,087,858
KANAMYCIN 3-PHENYLSALICYLATE
Frank H. Buckwalter, Dewitt, and Alphonse P. Granatek, Syracuse, N.Y., assignors to Bristol-Myers Company, New York, N.Y., a corporation of Delaware
No Drawing. Filed Mar. 14, 1960, Ser. No. 14,545
5 Claims. (Cl. 167—65)

This invention relates to a novel antibacterial therapeutic agent and, more particularly, to kanamycin 3-phenylsalicylate.

Kanamycin is a stable, basic, water-soluble, commercially available antibiotic first described by Umezawa et al. (see Umezawa et al., "Production and Isolation of a New Antibiotic, Kanamycin," The Journal of Antibiotics (Japan), Series A, X: 181–188, September 1957; Maeda et al. and Umezawa, "Studies on Kanamycin," The Journal of Antibiotics (Japan), Series A, X: 228–231, September 1957; Takeuchi et al. and Umezawa, "Biological Studies on Kanamycin," The Journal of Antibiotics (Japan), Series A, X: 107–114, May 1957; Cron et al. and Hooper, J. Amer.' Chem. Soc. 80, 752–753, 2342 and 2911–1912, 1958, and Gourevitch et al., Antibiotics and Chemotherapy 8 (3), 149–159, 1958).

Kanamycin exhibits effective therapeutic antibacterial activity against Gram-positive bacteria, Gram-negative bacteria and mycobacteria. In the treatment of systemic infections, it is poorly absorbed upon oral administration in the form of its free base, hydrochloride or sulfate and consequently has been administered by injection.

The advantages of oral over parenteral administration are well known and it is the object of the present invention to provide for oral administration in the therapy of systemic bacterial infections a form of kanamycin which is well-absorbed and nontoxic. It is also a specific object of the present invention to provide therapeutic compositions comprising kanamycin 3-phenylsalicylate which are useful in the treatment of urinary tract infections. These infections are very frequent and give rise to many problems in their treatment. The microorganisms causing the infections easily become resistant during treatment with an antibacterial agent, or are replaced by other species resistant to the drug. Furthermore, these infections cause much discomfort and pain to the patients.

The object of the present invention has been achieved by the provision, according to the present invention, of kanamycin 3-phenylsalicylate and of therapeutic compositions comprising kanamycin 3-phenylsalicylate.

Use is made of the kanamycin 3-phenylsalicylate of the present invention in tablet or capsule form, e.g., as the pure chemical or admixed with a customary diluent such as lactose, in aqueous solutions or in suspensions in nontoxic oils and the like. Other agents may be combined with kanamycin 3-phenylsalicylate in a therapeutic composition to provide increased scope of activity and usefulness. Such additional agents include lipotropic agents particularly methionine, choline, inositol and beta-sitosterol; laxatives, e.g., phenolphthalein; sedatives, e.g., barbiturates, bromides; an analgesic agent such as 2,6-diamino-3-phenylazopyridine and the nontoxic acid addition salts thereof; other antibiotic agents, e.g., penicillin salts, streptomycin, dihydrostreptomycin, bacitracin, polymixin, tyrothricin, erythromycin, carbomycin, tetracycline, oxytetracycline, chlortetracycline, chloramphenicol, cycloserine, novobiocin, colistin and the sulfa drugs, e.g., sulfisoxazole, sulfadiazine, sulfamerazine, sulfamethiazine, sulfadimethine, sulfacetamide, sulfamethylthiadiazol, sulfapyridine, and sulfathiazol, any of which may be used alone or in any combination of two or three sulfonamides; diuretics, such as, chlorathiazide, hydroflumethiazide, hydrochlorathiazide, acetazolamide, etc.; and vitamins, e.g., vitamins A, $A_1$, $B_1$, $B_2$, $B_6$, $B_{12}$ and members of that family, vitamins C, $D_2$, $D_3$ and E, and folic acid and members of that family. In some cases such combinations attack a wider range of organisms or show synergistic efficacy or provide decreased toxicity with equal efficacy. The term "tetracycline" as used in this specification and the appended claims refers to tetracycline in all of its therapeutic forms, e.g., the amphoteric compound per se, hydrates, acid addition salts, alkali metal salts, alkaline earth and other metal salts, salts of ammonia or amines, chelates, double salts and complexes such as tetracycline sodium and potassium hexametaphosphate.

The dosage used is of course at the discretion of the attending physician but will frequently be, in terms of mgm. kanamycin base activity, 1.0–10.0 g. per day or preferably about 2.5 g. Dosage will frequently be divided, e.g., one or two 250 or 500 mgm. capsules four or six times a day. A capsule containing 510 mg. kanamycin 3-phenylsalicylate has the equivalent of 250 kanamycin base activity. A preferred therapeutic composition according to the present invention is one comprising at least 250 mg. of kanamycin 3-phenylsalicylate and at least 50 mg. of a member selected from the group consisting of 2,6-diamino-3-phenylazopyridine and the nontoxic acid addition salts thereof. Another composition of this invention comprises at least 250 mg. of kanamycin 3-phenylsalicylate, at least 50 mg. of a member selected from the group consisting of 2,6-diamino-3-phenylazopyridine and the nontoxic acid addition salts thereof, and at least 250 mg. of a member selected from the group of soluble sulfonamides consisting of sulfisoxazole, sulfacetamide, sulfamethylthiadiazol and mixtures thereof.

The kanamycin molecule contains four basic, salt forming groups and can therefore combine with 3-phenylsalicylic acid to form a kanamycin 3-phenylsalicylate containing one, two, three or four molecules of 3-phenylsalicylic acid; the last-named is preferred but all are useful and part of the present invention. In the present invention use is normally made of the mixture of kanamycin A and kanamycin B obtained directly by fermentation and extraction but, if desired, either pure kanamycin A or pure kanamycin B may be used or use may be made of a mixture of equal parts by weight of kanamycin A and kanamycin B. All are of approximately equal antibacterial effectiveness except against mycobacteria; in that case, use of pure or nearly pure kanamcyin A is preferred.

The following examples illustrate the invention but are not to be construed as limiting the same.

EXAMPLE I

*Preparation of Kanamycin 3-Phenylsalicylate*

A solution of 3-phenylsalicylic acid (61.95 g.) in 2200 ml. of methanol is added with stirring to a solution of kanamycin base (70.0 g.) in 210 ml. of distilled water.

A light amber solution with some precipitate results. The solution is evaporated to dryness using methanol to aid in the drying. The product, kanamycin 3-phenylsalicylate, weighs 133 g. and has a potency of 464 mcg. of kanamycin base activity per mg. Kanamycin A-3-phenylsalicylate is prepared according to the procedure described above when pure kanamycin A is used in place of the mixed kanamycin A and B.

EXAMPLE II

One capsule containing 500 mg. kanamycin base activity as kanamycin sulfate is administered orally to each of 10 human subjects. The total amounts of kanamycin base activity excreted in the urine of each subject during various periods thereafter is determined to be as set forth in Table A.

From Table A it can be seen that the average amount of kanamycin base activity excreted in the urine of the subjects taking kanamycin sulfate is 6.87 mg. which is 1.37% of the dose given. The superiority of kanamycin 3-phenylsalicylate is demonstrated in Table B by showing that the average amount of kanamycin base activity excreted in the urine of subjects taking 500 mg. kanamycin base activity as kanamycin 3-phenylsalicylate is 19.6 mg. or 3.9% of the dose given.

EXAMPLE IV

In further kanamycin urine studies, two capsules each containing 250 mg. kanamycin base activity as kanamycin 3-phenylsalicylate were administered orally to each of 5 human subjects at 12 hour intervals for 3 days. The total amount of kanamycin base activity found in the

TABLE A.—KANAMYCIN URINE CONCENTRATIONS IN HUMAN SUBJECTS

[Oral administration of kanamycin sulfate]

| Patient | Age | Sex | Weight | Urine in volume and concentration | | | | | | | | Total mg. excreted in 24 hours |
|---|---|---|---|---|---|---|---|---|---|---|---|---|
| | | | | 0–6 hours | | 6–12 hours | | 12–18 hours | | 18–24 hours | | |
| | | | | Volume in cc. | Mcg.[1] per cc. | Volume in cc. | Mcg.[1] per cc. | Volume in cc. | Mcg.[1] per cc. | Volume in cc. | Mcg.[1] per cc. | |
| A | 56 | M | 118 | 590 | 4.5 | 360 | 3.65 | 470 | 1.70 | 110 | 5.3 | 5.35 |
| B | 41 | F | 115 | 90 | 120 | 160 | 26 | 200 | 5.80 | 80 | 3.95 | 16.44 |
| C | 43 | F | 148 | 715 | 1.10 | 160 | 4.50 | 215 | 1.30 | 300 | <1.0 | 1.79 |
| D | 36 | F | 170 | 500 | 4.80 | 640 | 4.20 | 525 | <1.0 | 350 | <1.0 | 5.09 |
| E | 39 | M | 190 | 220 | 18.00 | 315 | 9.40 | 120 | 3.50 | 315 | <1.0 | 7.34 |
| F | 39 | M | 180 | 50 | 7.90 | 80 | 20.50 | 385 | 1.80 | 275 | 1.40 | 3.11 |
| G | 44 | F | 104 | 845 | 8.30 | 670 | 3.10 | 620 | 4.20 | 465 | <1.0 | 11.69 |
| H | 47 | F | 133 | 725 | 6.00 | 210 | 5.00 | 355 | <1.00 | 405 | <1.0 | 5.40 |
| I | 30 | M | 168 | 180 | 17.50 | 300 | 7.10 | 885 | <1.00 | 250 | 8.90 | 7.51 |
| J | 24 | M | 187 | 385 | 6.00 | 930 | 1.60 | 1,020 | <1.0 | 330 | 3.45 | 4.94 |
| Average | | | | | | | | | | | | 6.87 |

[1] Micrograms of kanamycin base activity per cc. of urine.

EXAMPLE III

The ability of kanamycin 3-phenylsalicylate to provide useful amounts of kanamycin base activity in the urine is demonstrated by a clinical trial in which two capsules, each containing 250 mg. kanamycin base activity as kanamycin 3-phenylsalicylate, are administered to each of 5 human subjects. The total amount of kanamycin base activity excreted in the urine of each subject during various periods thereafter is determined to be as set forth below in Table B.

urine of each subject during various periods following the first administration is set forth in Table C.

It will be seen from the data of Table C that the average total excretion during the first twenty-four hour period was 15.7 mg. per subject and that the average total excretion per subject after the seventy-two hour period was 78.0 mg. of kanamycin base activity (2.6% of the dosage given).

The kanamycin 3-phenylsalicylate capsules used in this test were prepared as set forth below in Example V.

TABLE B.—KANAMYCIN URINE CONCENTRATION IN HUMAN SUBJECTS

[Oral administration of kanamycin 3-phenylsalicylate]

| Patient | Excretions of kanamycin base activity in urine | | | | | | | | | Total mg. excreted | Percent of dose excreted |
|---|---|---|---|---|---|---|---|---|---|---|---|
| | 0–6 hours | | | 6–12 hours | | | 12–24 hours | | | | |
| | Vol. in cc. | Mcg. per cc. | Mg. excreted | Vol. in cc. | Mcg. per cc. | Mg. excreted | Vol. in cc. | Mcg. per cc. | Mg. excreted | | |
| 1 | 625 | 8.1 | 5.06 | 500 | 1.60 | 0.8 | 415 | <1.0 | 0 | 5.86 | 1.2 |
| 2 | 560 | 55.0 | 30.8 | 275 | 17.0 | 4.68 | 565 | <1.0 | 0 | 35.5 | 7.1 |
| 3 | 565 | 7.6 | 4.29 | 325 | 4.10 | 1.33 | 435 | <1.0 | 0 | 5.62 | 1.1 |
| 4 | 325 | 39.0 | 12.7 | 675 | 2.10 | 1.42 | 650 | <1.0 | 0 | 14.1 | 2.8 |
| 5 | 235 | 130 | 30.6 | 235 | 20.0 | 4.7 | 375 | 3.7 | 1.39 | 36.7 | 7.3 |
| Average | 462 | 47.9 | 16.7 | 402 | 8.96 | 2.59 | 488 | 0.74 | 0.28 | 19.6 | 3.9 |

TABLE C.—KANAMYCIN URINE CONCENTRATION IN HUMAN SUBJECTS

[Oral administration of kanamycin 3-phenylsalicylate]

| Patient | Age | Sex | Wt. | Micrograms of kanamycin per ml. of urine | | | | | | | | | | | | | | |
|---|---|---|---|---|---|---|---|---|---|---|---|---|---|---|---|---|---|---|
| | | | | 0–6 hours | | | 6–12 hours | | | 12–24 hours | | | 24–30 hours | | | 30–36 hours | | |
| | | | | Vol. in c.c. | Mcg. per c.c. | Mg. excreted | Vol. in c.c. | Mcg. per c.c. | Mg. excreted | Vol. in c.c. | Mcg. per c.c. | Mg. excreted | Vol. in c.c. | Mcg. per c.c. | Mg. excreted | Vol. in c.c. | Mcg. per c.c. | Mg. excreted |
| 1 | 47 | M | 195 | 260 | 28.0 | 7.3 | 450 | 7.5 | 3.4 | 1,230 | 3.8 | 4.7 | 435 | 3.1 | 1.3 | 975 | <1.0 | 0 |
| 2 | 46 | M | 157 | 725 | 18.0 | 13.0 | 460 | <1.0 | 0 | 1,070 | 7.3 | 7.8 | 1,010 | 4.3 | 4.3 | 900 | <1.0 | 0 |
| 3 | 25 | M | 150 | 135 | 65.0 | 8.8 | 935 | 1.8 | 1.7 | 555 | 8.9 | 4.9 | 530 | 60.0 | 31.8 | 875 | 2.8 | 2.4 |
| 4 | 38 | M | 147 | 235 | 5.1 | 1.2 | 245 | 2.1 | 0.5 | 620 | 4.8 | 3.0 | 210 | 24.0 | 5.0 | 450 | 3.5 | 1.6 |
| 5 | 41 | M | 175 | 260 | 43.0 | 11.2 | 235 | 10.0 | 2.4 | 520 | 17.0 | 8.8 | 225 | 170.0 | 38.2 | 350 | 17.0 | 6.0 |
| Average | | | | 323 | 31.8 | 8.3 | 465 | 4.3 | 1.6 | 799 | 8.4 | 5.8 | 482 | 52.3 | 16.1 | 710 | 4.7 | 2.0 |

| Patient | Age | Sex | Weight | Micrograms of kanamycin per ml. of urine | | | | | | | | | | | | Total mg. excreted | Percent of dose excreted |
|---|---|---|---|---|---|---|---|---|---|---|---|---|---|---|---|---|---|
| | | | | 36–48 hours | | | 48–54 hours | | | 54–60 hours | | | 60–72 hours | | | | |
| | | | | Vol. in cc. | Mcg. per cc. | Mg. excreted | Vol. in cc. | Mcg. per cc. | Mg. excreted | Vol. in cc. | Mcg. per cc. | Mg. excreted | Vol. in cc. | Mcg. per cc. | Mg. excreted | | |
| 1 | 47 | M | 195 | 625 | 6.5 | 4.1 | 260 | 55.0 | 14.3 | 270 | 3.7 | 11.0 | 660 | 7.6 | 5.0 | 51.1 | 1.70 |
| 2 | 46 | M | 195 | 650 | 9.4 | 6.1 | 780 | 20.0 | 15.6 | 530 | 4.8 | 2.5 | 1,120 | 11.0 | 12.3 | 61.6 | 2.05 |
| 3 | 25 | M | 150 | 300 | 39.0 | 11.7 | 125 | 95.0 | 11.9 | 300 | 16.0 | 4.8 | 220 | 70.0 | 15.4 | 93.4 | 3.11 |
| 4 | 38 | M | 147 | 700 | 7.3 | 5.1 | 150 | 240.0 | 36.0 | 1,010 | 18.0 | 18.2 | 630 | 3.7 | 2.3 | 72.9 | 2.42 |
| 5 | 41 | M | 175 | 350 | 5.9 | 2.1 | 80 | 340.0 | 27.2 | 120 | 46.0 | 5.5 | 520 | 19.0 | 9.9 | 111.3 | 2.71 |
| Average | | | | 525 | 13.6 | 5.8 | 279 | 150 | 21.0 | 446 | 17.7 | 8.4 | 630 | 22.3 | 9.0 | 78.0 | 2.60 |

EXAMPLE V

In the preparation of the kanamycin 3-phenylsalicylate capsules used in the clinical trials described in Example IV above, 51 g. of kanamycin 3-phenylsalicylate having a potency of 490 mcg. of kanamycin base activity per mg. was equally divided into 100 portions which were placed in 100 #60 capsules. Each capsule containing 510 mg. of kanamycin 3-phenylsalicylate contained the equivalent of 250 mg. kanamycin base activity.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. Kanamycin 3-phenylsalicylate.
2. Kanamycin A-3-phenylsalicylate.
3. A composition in oral unit dosage form useful in the treatment of urinary tract infections comprising at least 250 mg. of kanamycin 3-phenylsalicylate and at least 50 mg. of a member selected from the group consisting of 2,6-diamino-3-phenylazopyridine and the nontoxic acid addition salts thereof.
4. A composition in oral unit dosage form useful in the treatment of urinary tract infections comprising at least 250 mg. of kanamycin 3-phenylsalicylate, at least 50 mg. of a member selected from the group consisting of 2,6-diamino-3-phenylazopyridine, and at least 250 mg. of a member selected from the group of soluble sulfonamides consisting of sulfisoxazole, sulfacetamide, sulfamethylthiadiazol and mixtures thereof.
5. A composition in oral unit dosage form useful in the treatment of urinary tract infections comprising at least 250 mg. of kanamycin 3-phenylsalicylate, at least 50 mg. of a member selected from the group consisting of 2,6-diamino-3-phenylazopyridine, and at least 250 mg. of tetracycline.

References Cited in the file of this patent

UNITED STATES PATENTS

| | | |
|---|---|---|
| 2,870,138 | Murray | Jan. 20, 1959 |
| 2,931,798 | Umezawa et al. | Apr. 5, 1960 |

OTHER REFERENCES

Wilson et al.: Textbook of Organic Medicinal and Pharmaceutical Chemistry, 2nd edition, 1954 pp. 156–157; 488–501; 555–556 and 643–646.